(12) United States Patent
Thornton et al.

(10) Patent No.: US 8,397,156 B2
(45) Date of Patent: Mar. 12, 2013

(54) ORGANIZING DOCUMENTS THROUGH UTILIZATION OF PEOPLE TAGS

(75) Inventors: John Michael Thornton, Kirkland, WA (US); Alexander S. Brodie, Redmond, WA (US); Bryan P. Ferguson, Redmond, WA (US); Ananda Narayanan Pulamanthole Pisharathu, Redmond, WA (US); Samuel James Pinson, Sultan, WA (US); Shanjeef Satchithanantham, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 506 days.

(21) Appl. No.: 12/560,455

(22) Filed: Sep. 16, 2009

(65) Prior Publication Data

US 2011/0067087 A1    Mar. 17, 2011

(51) Int. Cl.
*G06F 17/00* (2006.01)
*G06F 7/00* (2006.01)

(52) U.S. Cl. ........ 715/229; 715/201; 715/205; 715/255; 715/256; 715/273; 707/621; 707/805; 707/999.009

(58) Field of Classification Search ............ 715/200, 715/201, 202, 204, 205, 209, 210, 226, 229, 715/234, 243, 244, 247, 251, 254, 255, 256, 715/273, 700, 760, 277, 733, 738, 739, 746, 715/751, 752, 756, 762; 707/621, 654, 705, 707/707, 805, 912, 913, 915, 917, 951, 953, 707/964, 999.009, E17.019, E17.02
See application file for complete search history.

(56) References Cited

U.S. PATENT DOCUMENTS

| | | | |
|---|---|---|---|
| 7,254,573 B2 | 8/2007 | Burke | |
| 7,587,101 B1 * | 9/2009 | Bourdev | 382/291 |
| 7,895,208 B2 * | 2/2011 | Konopnicki | 707/738 |
| 7,945,653 B2 * | 5/2011 | Zuckerberg et al. | 709/223 |
| 7,978,936 B1 * | 7/2011 | Casillas et al. | 382/305 |
| 2002/0103813 A1 * | 8/2002 | Frigon | 707/104.1 |
| 2003/0033296 A1 | 2/2003 | Rothmuller | |
| 2006/0184584 A1 | 8/2006 | Dunn | |
| 2006/0251292 A1 | 11/2006 | Gokturk | |
| 2007/0032244 A1 * | 2/2007 | Counts et al. | 455/456.1 |
| 2008/0027983 A1 * | 1/2008 | Erol et al. | 707/104.1 |
| 2008/0046458 A1 * | 2/2008 | Tseng et al. | 707/102 |
| 2008/0080743 A1 * | 4/2008 | Schneiderman et al. | 382/118 |
| 2008/0091723 A1 * | 4/2008 | Zuckerberg et al. | 707/104.1 |

(Continued)

OTHER PUBLICATIONS

Guy et al. "Public vs. Private—Comparing Public Social Network Information with Email", ACM, Nov. 8-12, 2008, pp. 393-402.*

(Continued)

*Primary Examiner* — Maikhanh Nguyen

(57) ABSTRACT

A method disclosed herein includes the acts of receiving a document that has a people tag assigned thereto, wherein the people tag comprises first data that is indicative of an identity of a first individual that corresponds to the document, and wherein the people tag is assigned to the document by an assignor, and accessing contact data pertaining to a second individual, wherein the contact data comprises second data that is indicative of identities of contacts of the second individual, wherein the second data comprises data that is indicative of the identity of the first individual. The method also includes comparing the contact data with the first data, and displaying the document on a computer screen in conjunction with text that identifies the first individual to the third individual, wherein the text indicates a name of the first individual as assigned to the first individual by the second individual.

20 Claims, 10 Drawing Sheets

U.S. PATENT DOCUMENTS

| | | | | |
|---|---|---|---|---|
| 2008/0162649 | A1 | 7/2008 | Lee | |
| 2009/0216773 | A1* | 8/2009 | Konopnicki | 707/10 |
| 2009/0324137 | A1* | 12/2009 | Stallings et al. | 382/306 |
| 2010/0054601 | A1* | 3/2010 | Anbalagan et al. | 382/180 |
| 2010/0232656 | A1* | 9/2010 | Ryu | 382/118 |
| 2010/0274859 | A1* | 10/2010 | Bucuk | 709/206 |

OTHER PUBLICATIONS

Soriano et al. "Enabling Semantics—Aware Collaborative Tagging and Social Search in an Open Interoperable Tagosphere", Proceedings of iiWAS2008, Nov. 24-28, 2008, pp. 84-91.*

"Why does the Picklist Show Multiple Names for the Same Person?", Retrieved at <<http://www.whollygenes.com/forums201/index.php?showtopic=311>>, Aug. 15, 2004, pp. 1-2.

Boyce Jim, "Manage Multiple Identities Masterfully in Windows 2000 Professional", Retrieved at <<http://articles.techrepublic.com.com/5100-10878_11-6104818.html>>, Aug. 14, 2006, pp. 1-2.

Dumbill Edd, "XML Watch: Finding Friends with XML and RDF", Retrieved at <<http://www.ibm.com/developerworks/xml/library/x-foaf.html>>, Jun. 1, 2002, pp. 1-7.

Sowe, et al. , "Identifying Knowledge Brokers that Yield Software Engineering Knowledge in OSS Projects", Retrieved at <<http://opensource.mit.edu/papers/IST-Vol-48-11-2006.pdf>>, Information and Software Technology 48 (2006), pp. 1025-1033.

"Identifying a Person from Email Address", Retrieved at <<http://answers.google.com/answers/threadview/id/165850.html>>, Feb. 22, 2003, pp. 2.

* cited by examiner

ORGANIZING DOCUMENTS THROUGH UTILIZATION OF PEOPLE TAGS

BACKGROUND

Advancements in computing technology, including increased amounts of memory, hard drive space, processing capabilities, etc. available in computing devices, have allowed an incredible number of documents to be generated and retained. Such documents are often generated and retained on personal computing devices such as desktop computers, laptop computers, multimedia players, mobile phones, etc. An issue that arises when a large number of documents exist on a computing device is how to organize such documents so that a particular document can be located quickly by a user. Oftentimes, users will create a hierarchy of folders and store certain documents particular folders in the hierarchy. While this organizational scheme may be effective for a relatively small number of documents over a relatively short amount of time, as the number of documents increases and an amount of time increases from when folders were initially created, users may be unable to remember where certain documents have been stored.

To allow users to more efficiently organize and locate documents, applications have been developed that automatically organize documents based at least in part upon metadata pertaining to the documents. For example, a document may be an image captured by a digital camera and transferred to a personal computer. An image viewing application can organize such images based upon dates that the images were created. Thus, for instance, a folder may be automatically created pertaining to a particular day, and all images captured by the digital camera on that day can be automatically placed in such folder. While such a scheme helps in connection with automatically organizing documents, users may have difficulty remembering precise dates that documents were created.

Another example mechanism that facilitates organizing documents on a computing device is enabling tagging of documents with user-defined metadata. Thus, for instance, if a document is an image that was captured when a user was on vacation at a particular location, the user can assign a tag to the image that indicates dates of the vacation, name of the location, etc. Thereafter, to locate a particular image, the user can search using a query that corresponds to metadata assigned to one or more documents, and the search can be undertaken over the metadata assigned to the documents. Generally, this can be an effective mechanism for a particular user in connection with organizing documents. However, if such documents are transferred for utilization or review by another user, such metadata may have little meaning to the other user.

SUMMARY

The following is a brief summary of subject matter that is described in greater detail herein. This summary is not intended to be limiting as to the scope of the claims.

Described herein are various technologies pertaining to organizing documents based at least in part upon identities of people that correspond to such documents. As used herein, a document may be an image, a video, a word processing document, a spreadsheet, or other suitable computer-readable document. People tags can be assigned to documents to indicate that a particular person or set of people correspond to a document. A people tag can be metadata assigned to a document that comprises data indicative of an identity of an individual. For instance, if the document is an image, people tags can be utilized to indicate identities of people that exist in the image.

A people tag can include a plurality of fields, wherein a subset of such fields can include data that is indicative of an identity of an individual that corresponds to the document to which the people tag is assigned. For instance, a field in a people tag may include a name given to the person by the individual that assigned the people tag to the document. Thus, for example, such name may be an informal name such as "Mom", "Jane", "John Doe", etc. Thus, a people tag can comprise data that identifies a person represented by the people tag to the person that assigns the people tag to one or more documents.

A people tag may also optionally include another field that can comprise an email address of the individual corresponding to the people tag. Yet another optional field in the people tag may comprise a unique identifier that corresponds to the person identified by the people tag, wherein the unique identifier may be an identifier that uniquely identifies an individual that uses a particular online service, such as an email service, an instant messaging service, or other suitable service. Furthermore, the people tag can be assigned to the document such that if a copy of the document generated, the people tag can exist with respect to such copy. Of course, the people tag may include other metadata that corresponds to the person identified by the people tag.

When the individual that assigns the people tag to the document reviews such document or attempts to locate such document, the document can be displayed based at least in part upon the people tag assigned to the document by the user. For instance, the document can be displayed in conjunction with a graphical item that represents an individual identified in the people tag. The name of the person corresponding to the people tag can be displayed in conjunction with the graphical item in a manner that is familiar to the individual that assigned the people tag to the document.

A second individual may wish to view documents that comprise people tags not assigned to the documents by the second individual. In an example, the second individual can log into a service that facilitates document organization/review by providing identification information (e.g., a username and password) to such service. Contact data of the second individual may then be ascertained, wherein contact data comprises data indicative of contacts of the second individual. The contact data can include names assigned to the contacts by the second individual, email addresses of contacts of the second individual, unique identifiers assigned to contacts of the second individual by the aforementioned service, etc. Once the contact data is accessible, a comparison can be undertaken between data in the people tags and the contact data, and documents can be organized/viewed based at least in part upon the comparison. Thus, documents can be organized around contacts of the second individual (the individual reviewing the documents) as such contacts are known to the second individual.

For example, if the people tag has a unique identifier corresponding thereto and a contact of the second individual also has the unique identifier corresponding thereto, then it can be ascertained that the person represented by the people tag is the aforementioned contact of the second individual. The document may then be linked to such contact, and the document can be organized/displayed accordingly. Similarly, if the content of the people tag includes an email address of a person represented by the people tag, and a contact of the second individual also has the email address, then there is a high probability that the person identified by the people tag is the contact of the second individual. The document may then be organized/displayed according to the contact data that corresponds to the contact of the second individual. Thus, documents with people tags assigned thereto can be organized/displayed in a manner that is familiar to a viewer of the document.

Other aspects will be appreciated upon reading and understanding the attached figures and description.

DETAILED DESCRIPTION

Figure 1:
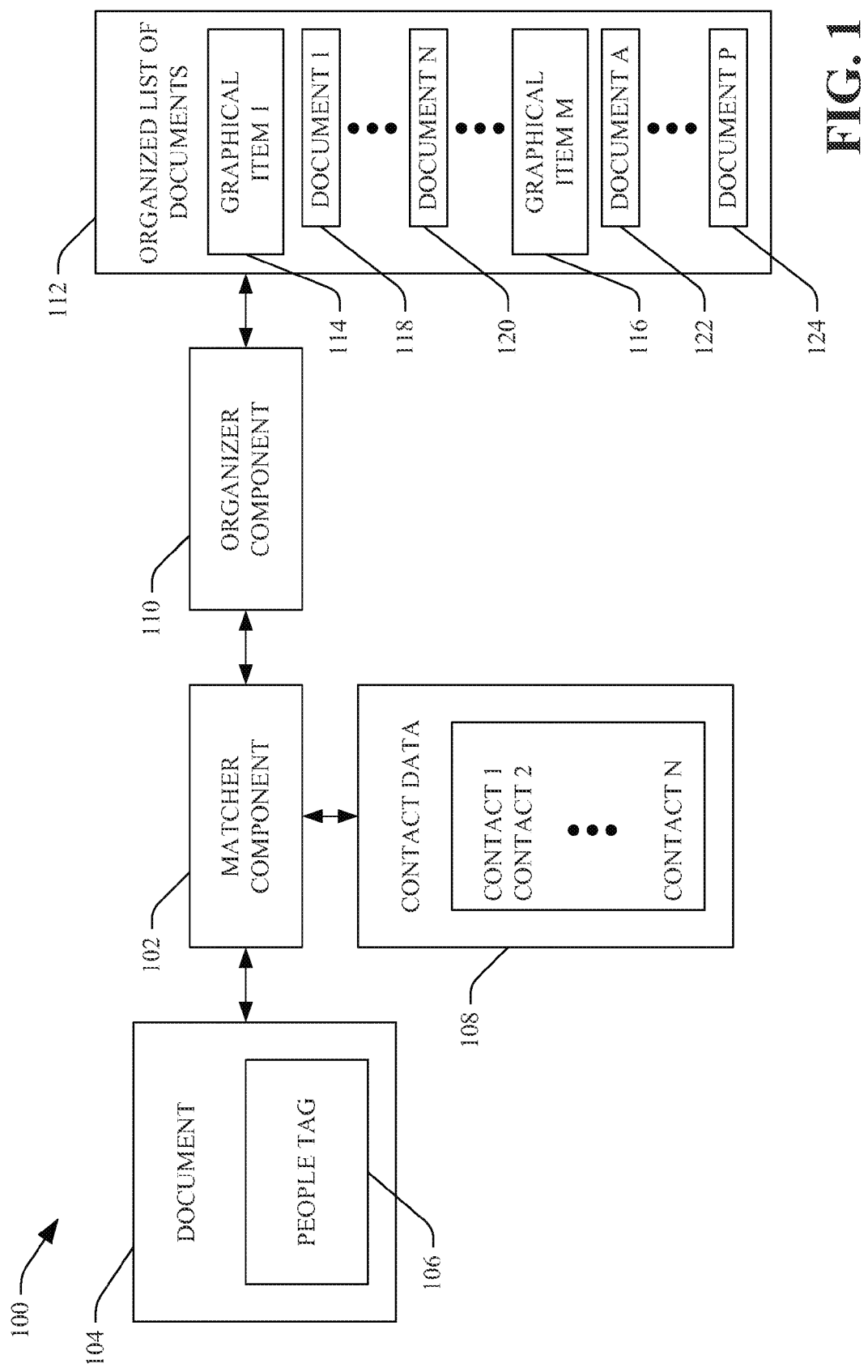
FIG. 1 is a functional block diagram of an example system that facilitates organizing documents with people tags assigned thereto.

Various technologies pertaining to organizing documents will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates organizing/displaying documents with people tags assigned thereto is illustrated. As used herein, a document can be any suitable computer readable document, such as a word processing document, a spreadsheet, an image, a video, etc. A people tag assigned to a document may comprise data that is indicative of an identity of a person that is represented by the people tag (and that corresponds to the document). For instance, if the document is an image and the image comprises a first individual, the people tag may comprise data that is indicative of the identity of the first individual. Such people tag can be assigned to a document by an owner of the document, a creator of the document, a viewer of the document, an editor of the document, etc. Data that can be included in a people tag includes a name of the person that is meaningful to the assignor of the people tag (e.g., customized identification data assigned to the person identified by the people tag by the assignor of the people tag). In another example, the people tag can include a unique identifier assigned to a person by a service, such as an email service, an instant messenger service, or other suitable service. Thus, the unique identifier can uniquely identify the person represented by the people tag. In yet another example, the people tag can include an email address of the person represented by the people tag. In still yet another example, the people tag can comprise facial features that can be utilized in connection with identifying the person represented by the people tag. Thus, as used herein, a people tag may include any suitable data that may be used in connection with identifying a person represented by the people tag. Furthermore, a people tag can be assigned to a particular portion of a document. For instance, if the document is an image and the image comprises multiple individuals, a people tag that represents a certain person can be assigned to a portion of the image that corresponds to the certain person (e.g., proximate or over a face of the certain person). Thus, a viewer of the image can quickly ascertain identities of people included in the image.

The system 100 can be utilized in connection with organizing documents based upon people that correspond to the documents. For instance, if an individual assigns multiple people tags corresponding to multiple individuals to a plurality of documents, such documents can be organized around the people that correspond to such documents. Therefore, for example, if a person tagged multiple documents with the people tag "Jane Doe" (e.g., because Jane Doe appeared in multiple images), such documents can be organized together such that the viewer of the documents can quickly ascertain which documents correspond to Jane Doe. Moreover, when the document is opened, the people tag can be displayed at the particular location in the document where the people tag was placed by the assignor of the people tag (e.g., when a user hovers over or selects the particular location in the document).

The system 100 includes a matcher component 102 that receives a document 104 with a people tag 106 assigned thereto. The people tag 106 can be assigned to the document 104 by a first individual. Furthermore, the people tag 106 may comprise data that is indicative of the identity of the person represented by the people tag (which may be the first individual or another individual). As indicated above, the people tag 106 can comprise a name of the person represented by the people tag (as assigned to the person by the first individual), a unique identifier of the person represented by the people tag, an email address of the person represented by the people tag, or other data that is indicative of the identity of the person represented by the people tag. For example, the people tag 106 can comprise image data of a face of the person that is represented by the people tag 106, such that such image data can be compared with image data of another image that comprises the face of the person represented by the people tag 106.

In an example, the document 104 can be an image that comprises a contact of the first individual (the assignor of the people tag 106 to the document 104). The first individual can assign the people tag 106 to the image, thereby indicating that the image includes the contact of the first individual represented by the people tag 106. A third individual can desirably view the document 106 or view an organized collection of a plurality of documents. The matcher component 102 can receive the image and can compare content of the people tag 106 with contact data 108 of the third individual, wherein the contact data 108 comprises data corresponding to a plurality of contacts of the third individual. For instance, the third individual can sign into a service such as an email service, an instant messaging service or other suitable service, and the contact data 108 can be retrieved upon the third individual signing into the service. The contact data 108, as mentioned above, may include data that is indicative of identities of a plurality of contacts of the third individual, such as names assigned to contacts of the third individual by the third individual (e.g., the name "Mom" for the contact of the third individual that is the mother of the third individual). In another example, the contact data 108 may comprise one or more unique identifiers that uniquely identify contacts of the third individual (where the unique identifiers may be assigned by the service), email addresses of the contacts of the third individual, amongst other data that can be utilized to identify the contacts of the third individual. Thus, the matcher component 102 can determine that a person represented by the people tag 106 is a contact of the third individual by comparing content of the people tag 106 with the contact data 108. Additional details pertaining to which data can be compared and actions undertaken with respect to such comparison are provided below.

The system 100 may further comprise an organizer component 110 that can organize documents with people tags based at least in part upon the comparison between content of people tags and the contact data 108. The organizer component 110 can output an organized list of documents 112, wherein the organized list of documents 112 comprises a plurality of graphical items 114-116 that are representative of one or more contacts of the third individual. For instance, the first graphical item 114 may represent a first contact of the third individual, while the Mth graphical item 116 can identify an Mth contact of the third individual. In another example, the graphical items 114 and/or 116 may represent people corresponding to people tags assigned to documents, wherein such people may not be contacts of the third individual. Each of the graphical items 114-116 can have one or more documents associated therewith such that the one or more documents are displayed to the third individual in conjunction with graphical items that represent people that correspond to such documents. Thus, for example, the graphical item 114 can represent a first contact of the third individual, and a first document 118 through an Nth document 120 may be assigned people tags that represent the contact that is also represented by the graphical item 114. Therefore, each of the documents 118-120 is assigned a people tag that represents the contact, and the contact is also represented by the graphical item 114. Similarly, a plurality of documents 122-124 can be displayed in conjunction with the Mth graphical item 116. The documents 122-124 are assigned people tags that represent the contact, and the contact is also represented by the graphical item 116.

Moreover, if the persons represented by the graphical items 114 and 116 are contacts of the third individual, such graphical items 114 and 116 can be displayed in a manner that is familiar to the third individual (e.g., the graphical items 114 and 116 may have text corresponding that identifies the contacts represented by the graphical items 114-116 to the third individual). Moreover, if any of the documents 118-124 are selected and opened on a personal computing device by the third individual, text that identifies contacts represented by people tags assigned to the documents may be shown to the third individual, wherein such text identities contacts in a manner that is familiar to the third individual.

To facilitate understanding of operation of the system 100, an example is provided herein. Again, the example is provided for sake of explanation, and is not intended to be limiting as to the scope of the hereto-appended claims. The document 106 can be an image, and a first individual can assign the people tag 106 to the image such that the people tag 106 represents the particular person in the image. The particular person can be a contact of the first individual, wherein the contact is the mother of the first individual. Thus, when reviewing the image, text of "Mom" is displayed to the first individual. Additionally, the people tag 106 may comprise a unique identifier that uniquely identifies the person represented by the people tag 106. For instance, the person represented by the people tag 106 can have an account with a service (e.g., an email service, an instant messaging service, . . . ), and the first individual may also has an account with such service. The first individual may email the image to a second individual, where the second individual is a cousin of the first individual. Thus, the person represented by the people tag 106 is an aunt of the second individual.

The second individual may also have an account with the aforementioned service, and can have the person represented by the people tag 106 as a contact. When the second individual is logged into the service, the matcher component 102 can compare the contact data 108 pertaining to the second individual with the content of the people tag 106. The matcher component 102 can ascertain that the person represented by the people tag 106 is a particular contact of the second individual by comparing the content of the people tag 106 with the contact data 108. In a specific example, the matcher component 102 can determine that the person represented by the people tag 106 is the particular contact of the second individual by comparing the unique identifier in the people tag 106 with the unique identifier in the contact data 108.

The organizer component 110 can cause the image to be linked to the particular contact such that the image is displayed in conjunction with a graphical item and/or text that represents the particular contact. For instance, the particular contact (the person represented by the people tag 106) may be known to the second individual as "Aunt Jane". The organizer component 110 can cause the first graphical item 114 to be or include the text "Aunt Jane", and can cause the image to be displayed in conjunction with the first graphical item 114. Additionally, when the image is opened, the organizer component 110 can cause text of "Aunt Jane" to be displayed in conjunction with the person represented by the people tag 106 when the second individual is signed into the service. Thus a same document with a same people tag assigned thereto can be organized/displayed differently when different users are logged into the service. For instance, when the first individual is logged into the service, the image is in conjunction with the text "Mom"; and while the second individual is logged into the service, the same image can be displayed to the second user in conjunction with the text "Aunt Jane".

A manner in which documents can be organized/displayed can depend upon what type of data is included in the people tags compared to type of data in the contact data 108. For instance, if the people tag 106 comprises a unique identifier and contact data pertaining to a contact of an individual comprises the same unique identifier, then there is a high probability that the person represented by the people tag 106 is the aforementioned contact of the individual. Accordingly, the document 104 can be linked to the contact. In another example, the people tag 106 may comprise an email address and contact data pertaining to a particular contact may include the same email address. The matcher component 102 can determine that the email address in the people tag 106 is the same as the email address corresponding to the contact, and, for instance, can automatically link the document 104 to the contact since the person represented by the people tag 106 and the contact have the same email address. In yet another example, the people tag 106 may include a name by which the person represented by the people tag 106 is known to an individual, and the people tag 106 can also include an email address of the person represented by the people tag 106. A second individual may desirably view the document 106, and the matcher component 102 can compare the content of the people tag 106 with contact data of the second individual, wherein the contact data of the second individual comprises the same email address for a contact but a different name assigned to such contact. This can indicate that different people may share a same email address. The organizer component 110 may be configured to link the document 104 to the contact with the same email address, or may be configured to cause the document 104 to be not linked with contact with the same email address.

The system 100 may be configured to execute on a personal computing device, such as a desktop computer, a laptop computer, a mobile telephone, a gaming console, a mobile media player, or other device. For instance, documents may be retained in a data storage medium on the personal computing device, such as a hard drive. The matcher component 102 can be initiated upon a document viewing application being initiated, for example. The application may be used in connection with organizing/displaying/editing a particular type of document that resides on the personal computing device. For instance, the documents may be images, and the application may be an image viewing/editing/organization application. Upon initiating the application, all images on the hard drive or a certain portion of the hard drive can be analyzed and can be organized in accordance with people assigned to the documents and contacts of an individual viewing the documents.

In another example, the system 100 may be configured to execute in a browser when documents stored in a remote location are being viewed. In an example, images can be retained in an online image store and people tags can be associated with such images. Thus when an image is viewed by a user, contents of people tags can be used to identify one or more people existent in the image. Text used to inform viewers of who appears in the image can change, depending on the viewer of the image. For instance if a first individual signs into the service and views the images, the images may be arranged in or displayed in a manner consistent with contact data pertaining to the first individual; while if a second individual reviews the images, such images can be displayed/ arranged in accordance with contact data pertaining to the second individual.

In addition, the system 100 can be utilized in connection with augmenting/maintaining data corresponding to people tags. For instance, an assignor may assign the people tag 106 to the document 105, wherein the people tag 106 contact data for an individual that corresponds to the people tag 106. As indicated, the contact data may include contact data generated by the assignor of the people tag 106 to the document 104. Over time, such contact data can be altered (e.g., altered by the assignor or altered by the individual that corresponds to the people tag 106). As changes are made to the contact data, content of the people tag 106 can be updated. Moreover, if a document with a first people tag that corresponds to an individual is received and the first people tag has a particular set of data therein, and other documents have people tags corresponding to the same individual but the people tags have data that differs from the data in the first people tag, then a subset of the people tags can be updated.

Figure 2:
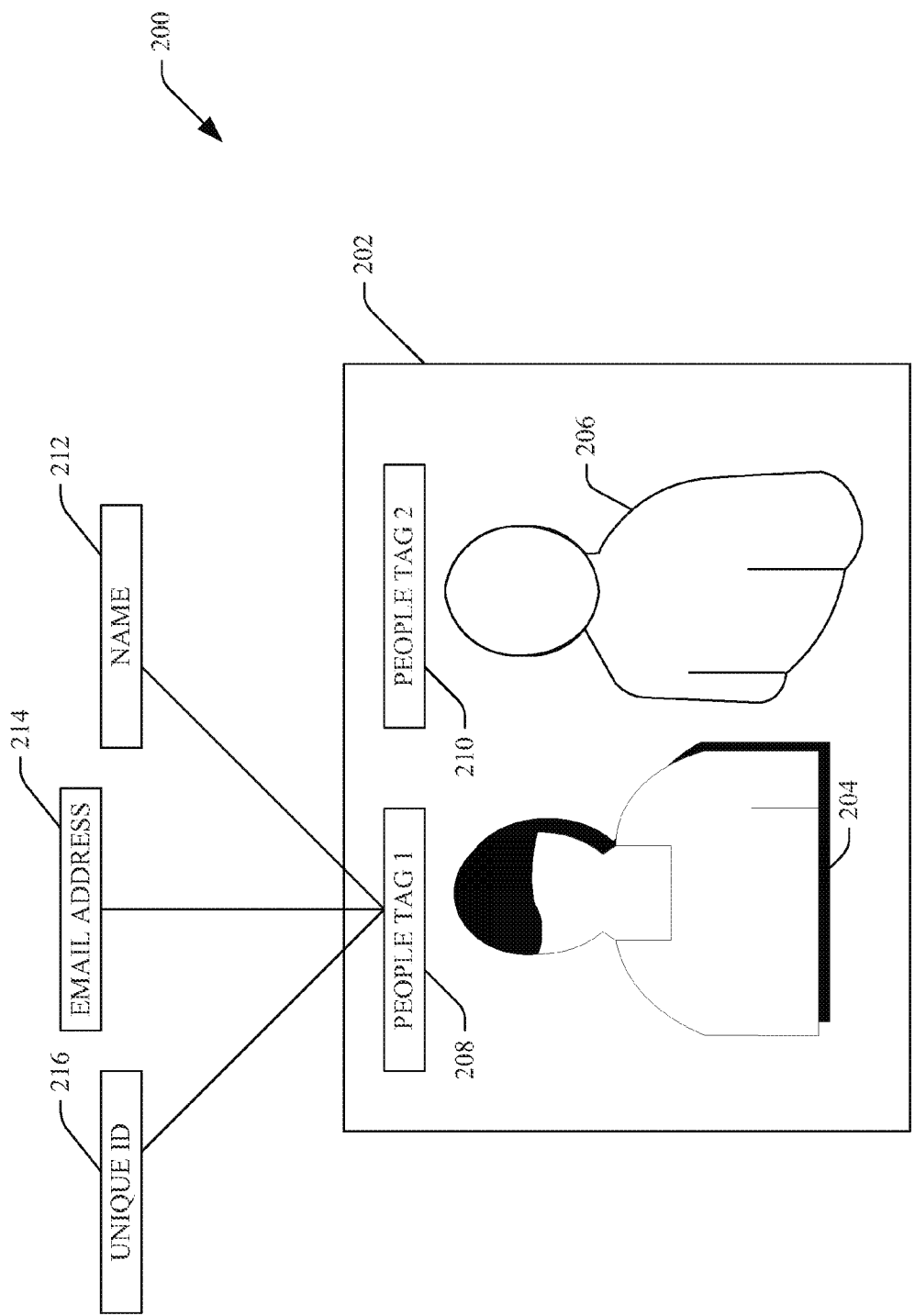
FIG. 2 is an example depiction of an image that has people tags assigned thereto.

With reference now to FIG. 2, an example depiction 200 of an image that has people tags assigned thereto that represent multiple individuals in the image is illustrated. The depiction 200 comprises an image 202 that includes a first individual 204 and a second individual 206. The people tags can be assigned to the image 202 by a particular user, for instance, that utilizes a service that is associated with an image viewing/editing/organizing application. In another example, the people tags can be assigned to the image 202 by a person who does not subscribe to the service.

In particular, a first people tag 208 and a second people tag 210 can be assigned to the image 202. The first people tag 208 can be assigned to a position in the image 202 that corresponds to the first individual 204. Similarly, the second people tag 210 can be assigned a position in the image 202 that corresponds to the second individual 206.

As shown, the people tag 208 may comprise a plurality of different types of data. For example, the people tag 208 may comprise a name 212 given to the first individual 204 to identify such person to an assignor of the people tag 208. For instance, if the first individual 204 is a mother of the assignor of the people tag 208, then the name 212 may be "Mom". Additionally or alternatively, the people tag 208 may comprise an email address 214 of the first individual 204. Furthermore, the people tag 208 may comprise a unique ID 216 that is assigned to the first individual 204 by a service such as an email service, an instant messaging service, or other suitable service. The people tag 210 may comprise similar types of data that corresponds to the second individual 206.

People tags can be assigned to documents (in this example, images) in a variety of manners. In one example, a user may initiate an image viewing/editing/organizing application. The user may be signed into a particular service and, upon initiating the application, contact data pertaining to contacts of the user can be provided or accessible to the photo viewing/ editing/organization application and/or the user. If the individual wishes to assign a people tag to an image, the individual can use a pointing mechanism such as a mouse or stylus, select a particular region of the image 202, and then inform the application that a particular person corresponds to such portion of the image. For instance, the individual may select a face of the first individual 204 through utilization of a computer mouse, and may indicate that the first individual 204 is a particular person. If the first individual 204 is a contact of the user, the user may already have data that is indicative of the identity of the first individual 204 in the contact data. For instance, the user may have an email address and a name of the first individual 204 in the contact data. Furthermore, if the first individual 204 also has an account with the service with which the user has an account, then the first individual 204 may also have a unique identifier corresponding thereto. When assigning the people tag 208 to the image 202, the user can automatically cause all identifying data corresponding to the first individual 204 that the user has in the contact data to be included in the people tag 208. Therefore the name 212, the email address 214, and the unique identifier 216 can be automatically included in the people tag 208. Of course, the user may not have all such information available. Thus, the people tag 208 may only comprise a name 212, may only comprise an email address 214, etc.

After the people tags 208 and 210 have been assigned, a subset of the identification data in the people tags 208 and 210 can be displayed to the user when the image 202 is viewed by the user. For example, when the user opens the image 202, a subset of data in the people tags 208 and 210 can be automatically displayed to the user in the image 202 such that the user can quickly ascertain identities of the first individual 204 and the second individual 206. In another example, identification data in the people tags 208 and 210 may only be displayed when the user mouses over or selects the portion of the image 202 that corresponds to such people tags 208 and 210. For instance, if the people tag 208 was assigned to the face of the individual 204 in the image 202, when the user viewed such image a name of the individual 204 (or email address or unique identification) is displayed to the user when the user hovers over the face of the individual 204 in the image 202.

As described above, once the people tags 208 and 210 are assigned to the image 202, such people tags 208 and 210 can become part of the image 202 and retained with the file, such that if the image is copied the people tags will be included in the copy of the image. When an individual other than the user who assigned the people tags 208 and 210 to the image 202 views the image 202, identification data in the people tags 208 and 210 can be utilized to display identification data of the first individual 204 and the second individual 206 in a manner that the view of the image 202 identifies the first and second individuals 204 and 206. For example, if the individuals 204 and 206 are the mother and father of the person who assigned the people tags 208 and 210 to the image 202, when such assignor of the people tags 208 and 210 views the image 202 text of "Mother" can be displayed in the image 202 in association with the first individual 204 and text of "Father" can be displayed in the image 202 in association with the second individual 206. The image 202 may then be copied or transferred to a son or daughter of the assignor of the people tags 208 and 210. When the son or daughter of the assignor of the people tags 208 and 210 views the image 202, text of "Grandmother" can be displayed in the image 202 in association with the first individual 204 while text of "Grandfather" can be displayed in the image 202 in association with the second individual 206. As described above and as will be described in more detail below, such customized display of text corresponding to the individuals 204 and 206 can be achieved by comparing content of the people tags 208 and 210 with contact data pertaining to an individual that is viewing the image 202.

Figure 3:
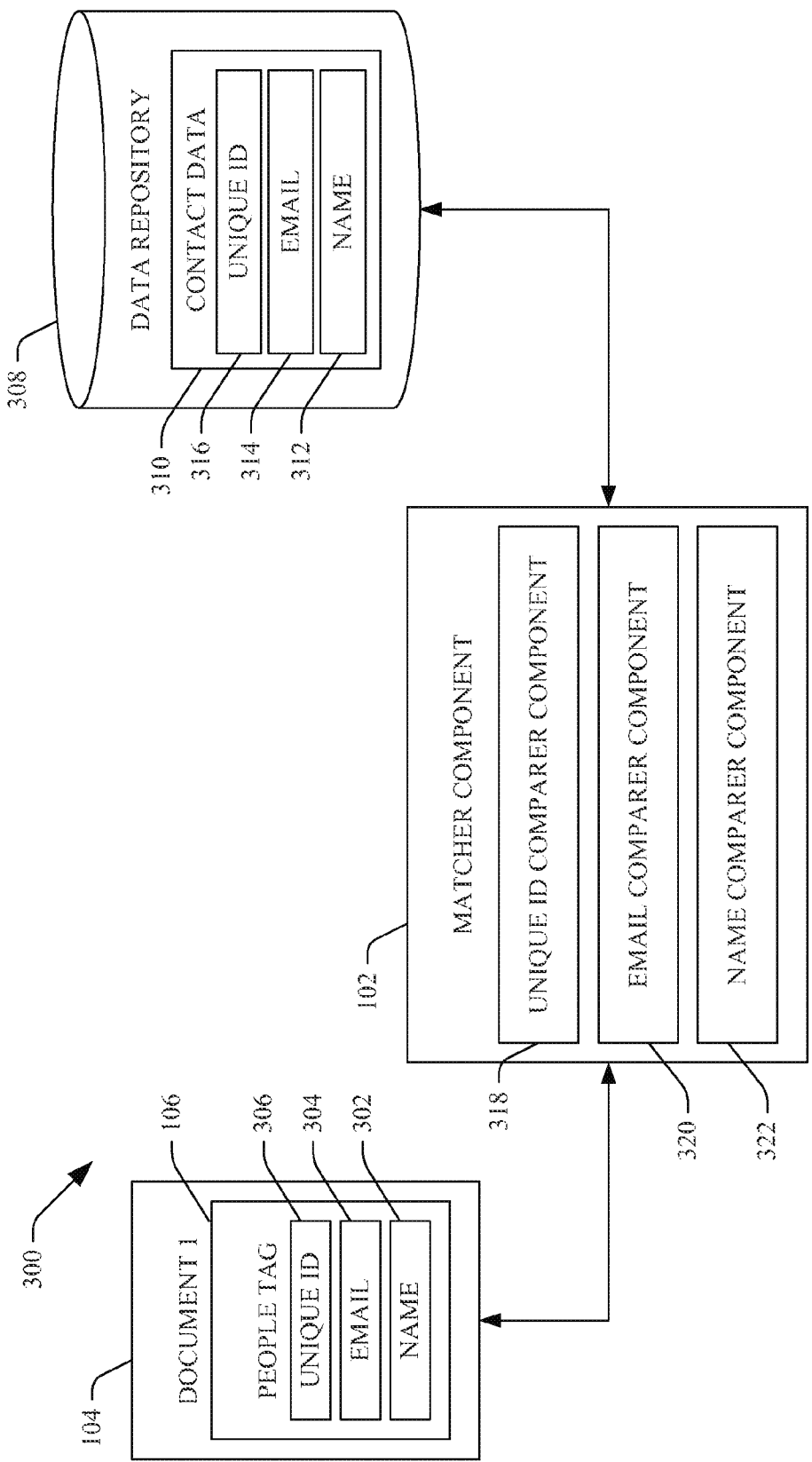
FIG. 3 is functional block diagram of an example system that facilitates comparing content of a people tag with contact data of an individual.

Referring now to FIG. 3, an example system 300 that facilitates comparing contents of a people tag with contact data of an individual viewing documents is illustrated. The system 300 comprises the matcher component 102, which can receive the document 104 that comprises the people tag 106 that is representative of an individual that corresponds to the document 104. The people tag 106 can comprise a name 302 given to the individual by an assignor of the people tag 106, an email address 304 of the individual represented by the people tag 106, a unique identifier 306 that corresponds to the individual represented by the people tag 106, and/or other data (e.g., facial features or other biometric data) that is indicative of an identity of the individual represented by the people tag 106.

The matcher component 102 may also access a data repository 308 that comprises contact data 310 pertaining to at least one contact of the viewer of the document 104. For instance, a user of a service may log into such service when initiating the application used to view/edit/organize documents (including the document 104). Upon the individual logging into the application, contact data can be downloaded from an online server and be made accessible to the matcher component 102. The contact data 310 can include one or more of a name 312 given to a contact in the contact data 310 by the individual viewing the document 104, an email address 314 of the contact, a unique identifier 316 assigned to the contact by an online service, or other suitable data that is indicative of an identity of the contact. For example, the contact may have an email address with a particular online service, and the unique identifier 316 may uniquely identify the contact amongst all others that use the online service.

The matcher component 102 can be configured to ascertain whether the document 104 can be linked to the contact for purposes of organization and/or viewing. The matcher component 102 may include a unique ID comparer component 318 that can compare the unique identifier 306 in the people tag 106 with the unique identifier 316 in the contact data 310. If both the people tag 106 and the contact data 310 have a unique ID associated therewith, and such unique ID is the same in the people tag 106 as it is in the contact data 310, then the matcher component 102 may, for instance, cause the document 104 to be linked to the contact corresponding to the unique ID for organizational/viewing purposes. A viewer of a document 104 will be provided with the name 312 assigned to the contact by the viewer of the document 104 when viewing/organizing the document 104. Such name 312 may be different than the name 302 in the people tag 106. In another example, the matcher component 102 may undertake other comparisons prior to linking the document 104 to the contact.

If additional comparisons are desired and/or if either the people tag 106 or the contact data 310 do not include a unique ID, the matcher component 102 can undertake other comparisons. The matcher component 102 can include an email comparer component 320 that can compare the email address 304 in the people tag 106 (if the email address 304 is included in the people tag 106) with email addresses in the contact data 310. If the email address 304 does not match an email address pertaining to a contact represented in the contact data 310, the email comparer component 320 can output an indication that the person represented by the people tag 106 is not the contact represented in the contact data 310, and thus the document 104 should not be linked to such contact. In an example, if the email comparer component 320 finds that the email address 304 in the people tag 106 is identical to the email address 314 corresponding to the contact, then the email comparer component 320 can output an indication that the person represented by the people tag 106 corresponds to the contact and that the document 104 is to be linked to the contact corresponding to the contact data 310 for viewing/organizational services. In another example, additional data may required by the matcher component 102 to output such indication.

The matcher component 102 may further comprise a name comparer component 322 that is configured to compare the name 302 in the people tag 106 with at least the name 312 that corresponds to the contact represented in the contact data 310. The matcher component 102 can determine whether or not to cause the document 104 to be linked to the contact based at least in part on the comparisons undertaken by the name comparer component 322.

In some cases, the individual represented by the people tag 106 will not correspond to any contact of the viewer of the document 104. In such a case, one or more of the name 302 in the people tag 106, the email address 304 in the people tag 106, or the unique ID 306 in the people tag 106 can be utilized when organizing/displaying the document 104 to the viewer of the document 104. Therefore, for instance, if the document 104 is an image, when a viewer of the document selects a person in the image that corresponds to a people tag, text pertaining to the name 302 assigned to the people tag 106 can be presented to the viewer of the document 104. In another example, the email address 304 may be displayed to the viewer of the document 104 when the portion of the image corresponding to the people tag 106 is selected by the viewer. In still yet another example, the unique ID 306 can be displayed to the viewer of the file, or text corresponding to unique ID 306 may be displayed to the viewer of the file. For instance, an individual associated with the unique ID 306 may have provided a name in connection with the unique ID 306. The matcher component 102 can access a unique identifier database (not shown) and retrieve such name that corresponds to the unique ID 306. This name may then be presented to the viewer of the document 104 or used in connection with organizing the document 104 amongst a plurality of other documents.

Provided below is an example table that comprises comparison data that can be employed by the matcher component 102 in connection with ascertaining whether or not to link a document to a contact based upon a comparison between contents of a people tag assigned to the document and contact data pertaining to a view of the document. The table includes indications of whether data in the people tag matches data pertaining to a contact of a view of a document and an action that may be undertaken given results of comparisons between content of people tags and contact data pertaining to the viewer. The actions are exemplary, and comparisons are not intended to be limited to the data included in the table. Where the term "no auto-action taken" is included in the table, such term indicates that the viewer can manually link the document to the contact if desired (such that auto-action can be undertaken in the future).

people tag 410. The people tags 408-410 may be assigned to be documents 404-406, respectively, by one or more assignors.

The system 400 may be utilized in connection with an application that facilitates viewing/organizing documents. The system 400 may include an identifier component 412 that is configured to receive user identification information upon the application being initiated by the user or prior to the application being initiated by the user. Such identification information may be or include a user name and a password. The identifier component 412 can pass such identification information to an online service 414, which can authenticate the user by analyzing this identification information. Upon the user being authenticated, the online service can locate contact data pertaining to the user. Such contact data may include data that is indicative of contacts of the user. The matcher component 102 can receive such contact data and can compare the contact data with the people tags 408 and 410 assigned to the documents 404-406. Based at least in part

| Name in people tag assigned to a document/name in contact data of a contact | Email address in people tag assigned to the document/ email address in the contact data for the contact | Unique identifier in people tag assigned to the document/ unique identifier in the contact data for the contact | Action |
| --- | --- | --- | --- |
| Match | Match | Match | Link the document to the contact |
| Match | Match | No match | No auto-action taken |
| Match | Match | Absent | Link the document to the contact |
| Match | No match | Match | No auto-action taken |
| Match | No match | No match | No auto-action taken |
| Match | No match | Absent | No auto-action taken |
| Match | Absent | Match | Link the document to the contact |
| Match | Absent | No Match | No auto-action taken |
| Match | Absent | Absent | No auto-action taken |
| No match | Match | Match | Link the document to the contact |
| No match | Match | No match | No auto-action taken |
| No match | Match | Absent | Link the document to the contact |
| No match | No match | Match | No auto-action taken |
| No match | No match | No match | No auto-action taken |
| No match | No match | Absent | No auto-action taken |
| No match | Absent | Match | Link the document to the contact |
| No match | Absent | No match | No auto-action taken |
| No match | Absent | Absent | No auto-action taken |

Figure 4:
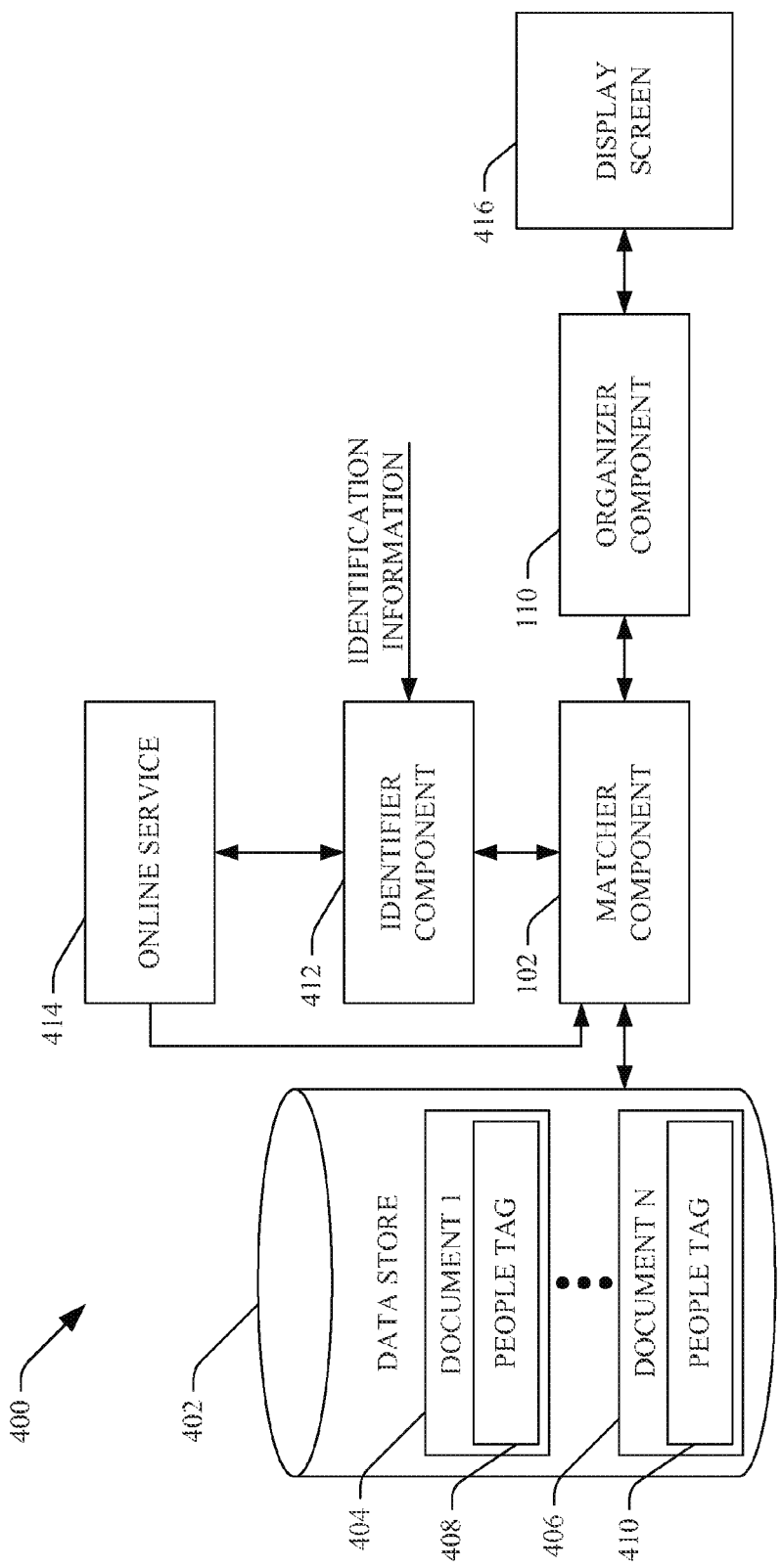
FIG. 4 is a functional block diagram of an example system that facilitates organizing/displaying documents that have people tags assigned thereto.

With reference now to FIG. 4, an example system 400 that facilitates automatically organizing documents based at least in part upon people corresponding to the documents is illustrated. System 400 comprises a data store 402 that comprises a plurality of documents 404-406. At least a subset of the documents 404-406 may comprise at least one people tag corresponding thereto. In an example, a document 404 comprises a people tag 408, while the document 406 comprises a upon such comparison, the matcher component 102 can output an indication of whether a particular document/people tag should be linked to a particular contact of the user, and the organizer component 110 can cause the plurality of documents 404-406 to be organized based at least in part upon the comparison undertaken by the matcher component 102. The organizer component 110 can cause the plurality of documents 404-406 to be displayed on a display screen 416 of a computing device such as a personal computer. Example graphical user interfaces illustrating how documents can be organized around people (contacts of users) are shown below.

Figure 5:
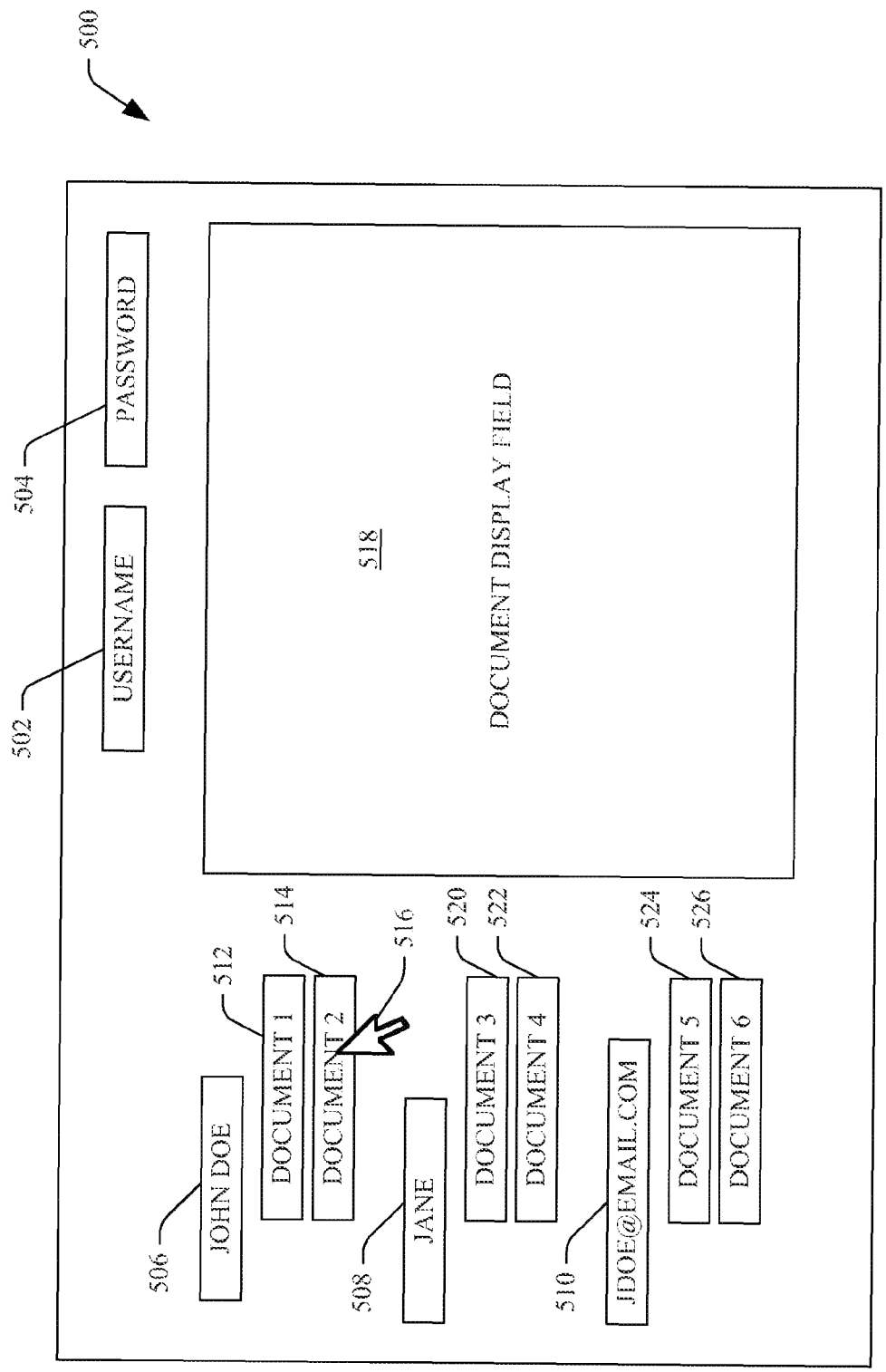
FIGS. 5-7 are example graphical user interfaces that depict organization/display of documents with people tags assigned thereto.

Referring now to FIG. 5, an example graphical user interface 500 that facilitates organizing documents with people tags around people represented by such people tags is illustrated. In the example shown in FIG. 5, the graphical user interface 500 corresponds to an application utilized in connection with viewing/organizing documents, wherein such application is associated with a service such as an email service, an instant messaging service, and/or other suitable service. The graphical user interface 500 may include a first field 502 that is configured to receive a username of a user that is employing the application to view/organize documents and a second field 504 that is configured to receive a password of such user. In the example graphical user interface 500, the user has yet to provide the first field 502 with a user name and the second field 504 with a password, and thus the user is not signed into the service.

When the application is initiated, the graphical user interface 500 can be presented to the user, and the application can locate certain types of documents existent in a certain location of a hard drive (or may search an entire hard drive) for documents of the aforementioned type. At least a subset of such documents may have people tags assigned thereto. As indicated above, the people tags may comprise a name assigned to a person by the assignor of the people tag, a unique identifier provided by a service, an email address, or other suitable data. The graphical user interface 500 comprises a first graphical item 506 that is representative of a first individual, a second graphical item 508 that is representative of a second individual, and a third graphical item 510 that is representative of a third individual. The graphical items 506-510 may be any suitable graphical item and may have text corresponding thereto to aid a viewer in recognizing/identifying individuals are that are represented by the graphical items 506-510.

The first graphical item 506 corresponds to a people tag that may have a unique identifier associated therewith. The application can analyze the unique identifier and access a database of unique identifiers. The unique identifier may be associated with a name provided by the individual that corresponds to the unique identifier. For example, the unique identifier may be JOHNDOE_2009. When the application is initiated, such unique identifier can be reviewed and compared with unique identifiers in a database of unique identifiers. It can be ascertained that such unique identifier corresponds to a person who has provided the name John Doe. Thus, if the user has not signed into the application via the first field 502 and the second field 504, the application can determine that text "John Doe" is to be shown with the first graphical item 506 to depict to a viewer that the first graphical item 506 corresponds to the person John Doe. Moreover, it can be ascertained that a first document 512 and a second document 514 have been assigned people tags that comprise the aforementioned unique identifier. Therefore, for example, the first document and the second document 512 and 514, respectively, may be images that include the person John Doe. A mouse pointer 516 is also shown, wherein the mouse pointer 516 is used to select the second document 514. Upon the mouse pointer 516 selecting the second document 514, the second document 514 can be displayed in a document display field 518. The document display field 518 may be utilized in connection with viewing the documents such as images, viewing text that identifies people, editing documents, etc.

The second graphical item 508 may correspond to a people tag that comprises a name assigned by an assignor. For instance, an unknown user may have assigned a people tag to a plurality of documents, wherein the people tag comprises the name "Jane". A third document 520 and a fourth document 522 can be displayed in conjunction with the second graphical item 508. Thus the third document 520 and the fourth document 522 have been assigned the people tag that comprises the name "Jane" to such documents. In this example, for instance, the people tag corresponding to the graphical item 508 may not have a unique identifier assigned thereto.

The third graphical item 510 may represent a person that corresponds to a people tag that comprises an email address but does not comprise a name assigned to the person or a unique identifier, for instance. A fifth document 524 and a sixth document 526 may be assigned people tags that comprise the email address JDOE@emaii.com. Thus, such documents 524 and 526 can be displayed in conjunction with the third graphical item 510 that represents the person that corresponds to the email address JDOE@email.com. Moreover, the third graphical item 510 can include the text "JDOE@email.com".

Figure 6:
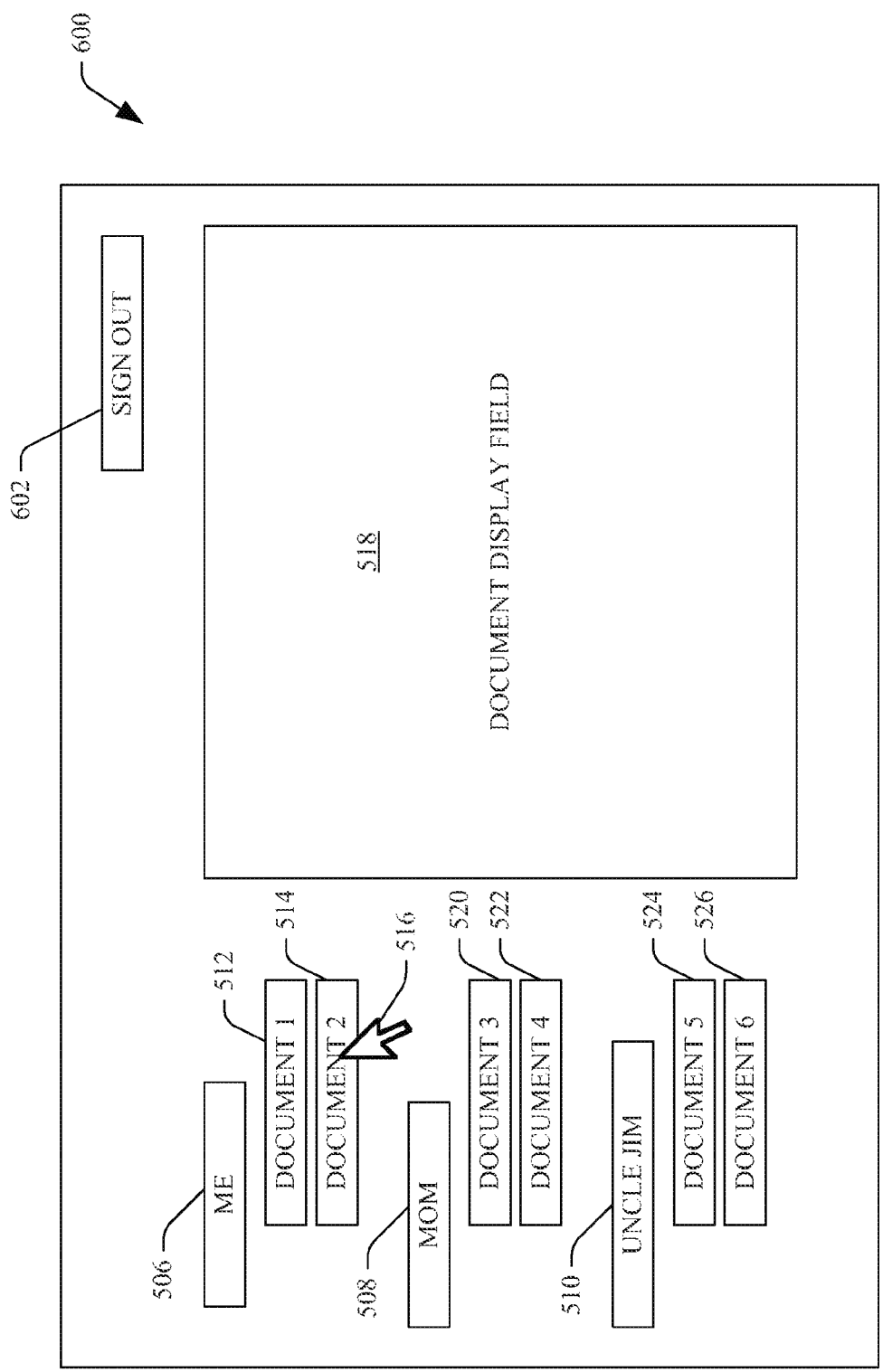

Referring now to FIG. 6, an example graphical user interface 600 that facilitates reviewing/editing/organizing documents around people is illustrated. In the example graphical user interface 600, a first individual has signed into a service that corresponds to the application associated with the graphical user interface 600. The graphical user interface 600 may include a button 602 that allows a user to sign out of the service. As can be discerned, when the first individual is signed into the online service, the graphical items 506, 508 and 510 can be displayed differently than when the first individual is not signed into the online service. As described above, the first graphical item 506 may represent a person that is represented by a people tag that comprises a unique identifier of the person. When the first individual signs into the online service, contact data of such first individual can be made accessible to a component/algorithm that is utilized to compare data in the people tags with the received contact data. Thus, the unique identifier included in the people tag corresponding to the first graphical item 506 can be compared with unique identifiers in the received contact data. Based at least in part upon such comparisons, a determination can be made that the unique identifier in the people tag corresponding to the first graphical item 506 is associated with text "Me" in contact data or profile data of the first individual. As can be ascertained, the first document 512 and the second document 514 are still shown to correspond to the first graphical item 506. However, such first graphical item 506 is associated with/includes text that allows the first individual that is signed into the service to quickly ascertain an identity of the person that corresponds to the first graphical item 506 (since such text corresponds to how the first individual wishes to identify the person represented by the first graphical item 506).

Additionally, the second graphical item 508 is shown as including/being associated with the text "Mom", and the third graphical item 510 is shown as including/being associated with the text "Uncle Jim". Again, such text or manner of displaying the second and third graphical items 508 and 510 can be determined by comparing content of people tags that correspond to the graphical items 508 and 510 with contact data of the first individual that is signed into the online service. Based at least in part upon the comparison, graphical data and/or textual data can be identified that can aid the first individual in connection with quickly ascertaining which of the first individual's contacts correspond to certain documents.

Figure 7:
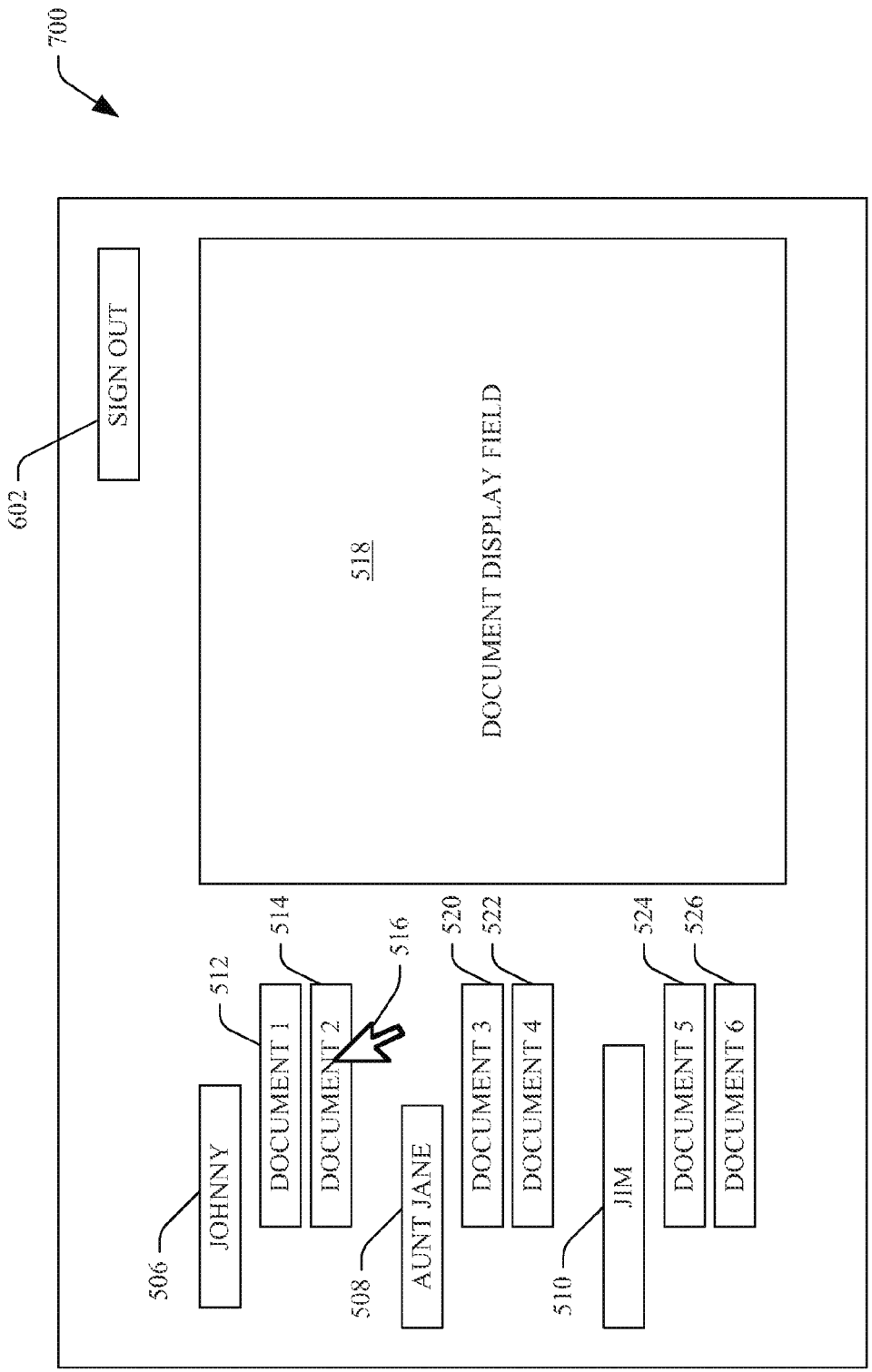

With reference now to FIG. 7, an example graphical user interface 700 that facilitates viewing/editing/organizing documents around people is illustrated. In this example, a second individual (different from the first individual discussed with respect to FIG. 6) can be signed into the online service when reviewing a substantially similar set of documents. As described above, when the second individual signs in to the online service, contact data of such second individual can be accessible and can be compared with content of people tags assigned to documents. Through comparison of the content of the people tags corresponding to the graphical items 506-510, it can be ascertained that the people tag corresponding to the first graphical item 506 represents a contact known to the second individual by the name "Johnny". The second graphical item 508 represents a person known to the second individual as "Aunt Jane", and the third graphical item 510 represents a person known to the second individual as "Jim". While not shown, the graphical items 506-510 can be arranged in alphabetical order. Thus how graphical items that correspond to documents are shown and an order in which they are displayed may depend upon who is viewing such documents.

Figure 8:
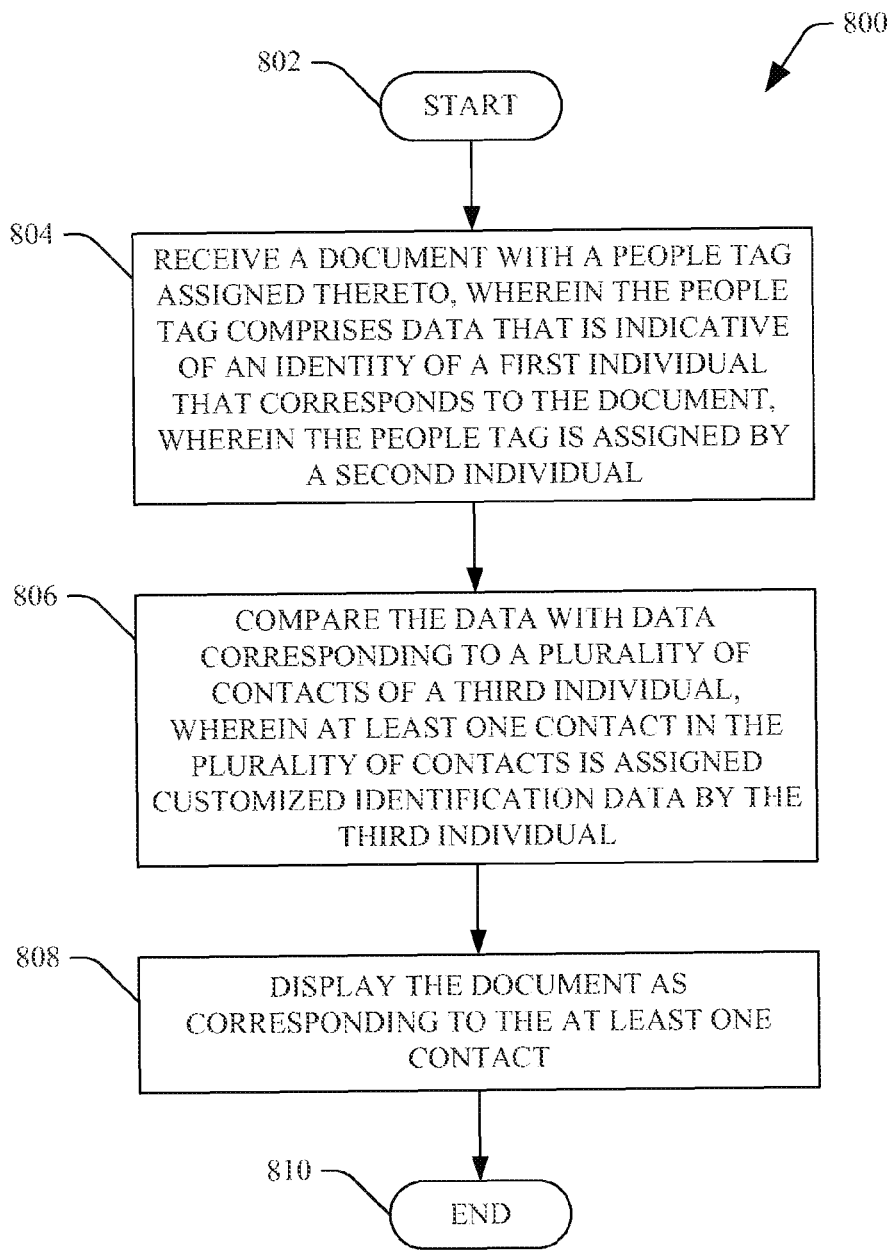
FIG. 8 is a flow diagram that illustrates an example methodology for displaying/organizing documents with people tags assigned thereto.
Figure 9:
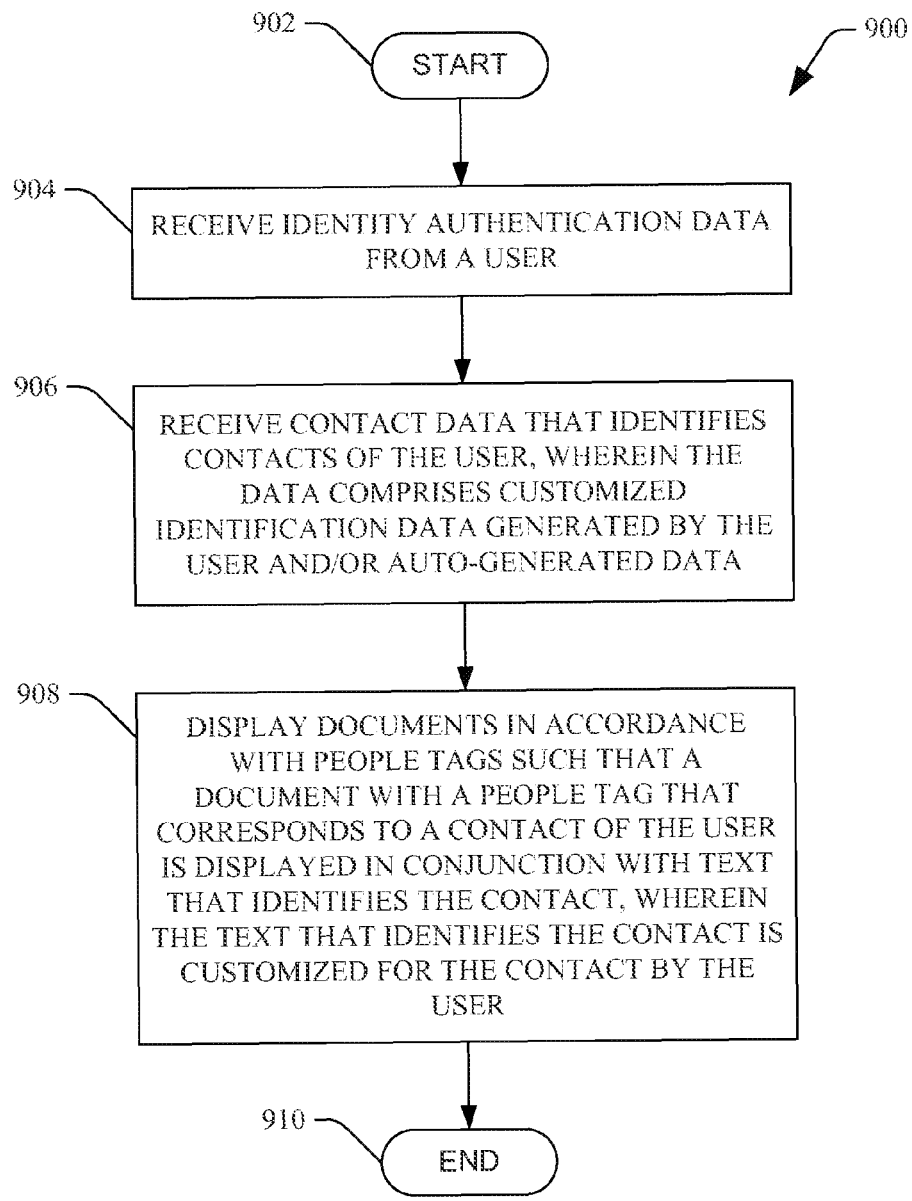
FIG. 9 is a flow diagram that illustrates an example methodology for displaying documents in accordance with people tags assigned thereto.

With reference to FIGS. 8 and 9, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 8, a methodology 800 that facilitates organizing/displaying documents based at least in part upon people tags assigned to such documents is illustrated. The methodology 800 begins at 802, and at 804 a document is received that has a people tag assigned thereto. As described above; the people tag can include data that is indicative of an identity of a first individual that corresponds to the document. For example, the document may be an image, and the first individual may be included in the image. In an example, a people tag can be assigned to a document by a second individual.

At 806, data in the people tag is compared with contact data of a third individual. For instance, the contact data can be provided when the third individual signs into a service. As described above, the contact data can include data that is indicative of identities of contacts of the third individual, including but not limited to names assigned to the contacts by the third individual, email addresses of the contacts of the third individual, names the contacts of the third individual have given themselves, unique identifiers corresponding to contacts of the third individual, etc. Thus, at least one of the contacts of the third individual can be assigned customized identification by the third individual.

At 808, the document is displayed as corresponding to at least one contact of the third individual based at least in part upon the comparison between the data included in the people tags assigned to the documents and the contact data pertaining to the third individual. A graphical item can be displayed on a computer screen that is representative of a first individual that corresponds to the people tag, wherein such graphical item can be shown in conjunction with text that identifies the first individual to the third individual (e.g., customized by the third individual to identify the first individual that corresponds to the people tag). The methodology 800 completes at 810.

Referring now to FIG. 9, example methodology 900 that facilitates organizing documents based at least in part upon people tags assigned thereto is illustrated. The methodology 900 begins at 902, and at 904 identity authentication data is received from a user. For instance, the user may be signing onto a service, and the identity authentication data may comprise a user name, password, biometric data, etc.

At 906, subsequent to the identity data being received at 904, contact data is received that identifies contacts of the user. The contact data can comprise customized identification data generated by the user, wherein the customized identification data identifies the contacts of the user to the user. For instance, such customized identification data include a name by which a contact is known to the user. In another example, the contact data can comprise data automatically generated by a contact storage service, such as a unique identifier and/or a name that corresponds to the unique identifier.

At 908, documents are displayed in accordance with people tags assigned to such documents, such that a document with a people tag that corresponds to a contact of the user is displayed in conjunction with text that identifies the contact to the user. That is, the text that identifies the contact of the user is customized for the contact by the user. Therefore, a set of documents can be organized around people, as such people are known to the user. Documents that do not have people tags assigned thereto may be arranged in any suitable manner, including alphabetically, by date of creation, by date of modification, based upon a graphical item that indicates no people tags have been assigned to these documents, or any other suitable manner.

Figure 10:
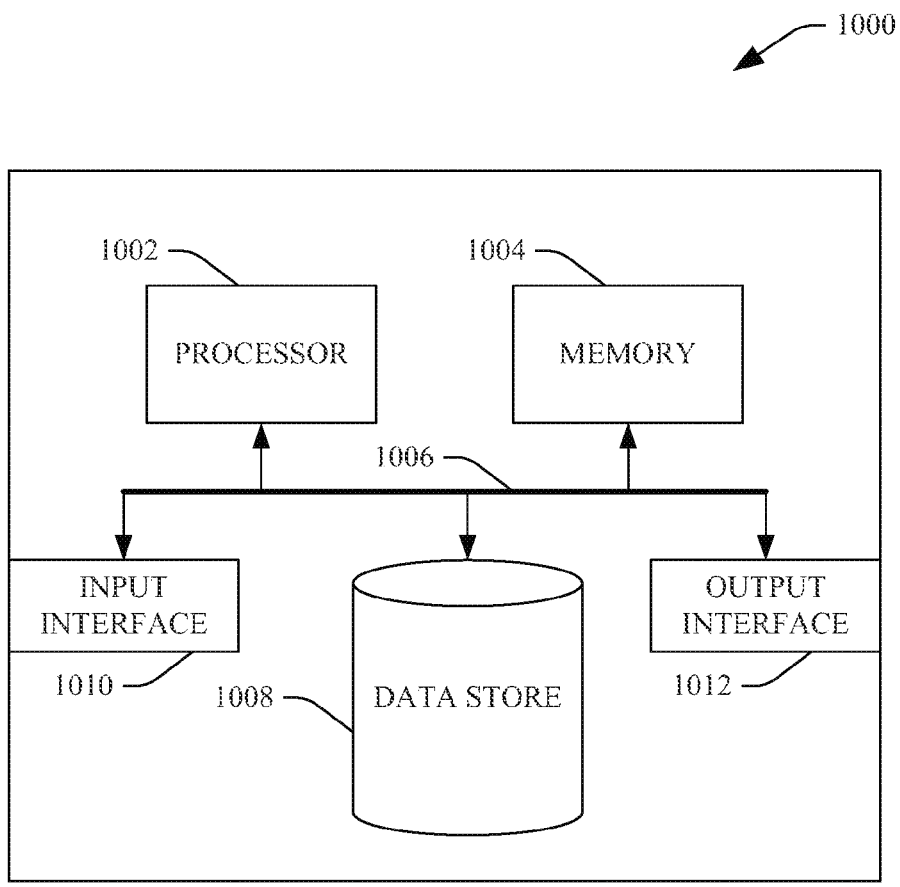
FIG. 10 is an example computing system.

Now referring to FIG. 10, a high-level illustration of an example computing device 1000 that can be used in accordance with the systems and methodologies disclosed herein is illustrated. For instance, the computing device 1000 may be used in a system that supports organizing, viewing and/or editing documents. In another example, at least a portion of the computing device 1000 may be used in a system that supports comparing data in people tags with contact data of users. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also stole contact data, documents, people tags, etc.

The computing device 1000 additionally includes a data store 1008 that is accessible by the processor 1002 by way of the system bus 1006. The data store 1008 may include executable instructions, people tags, documents, etc. The computing device 1000 also includes an input interface 1010 that allows external devices to communicate with the computing device 1000. For instance, the input interface 1010 may be used to receive instructions from an external computer device, from an individual, etc. The computing device 1000 also includes an output interface 1012 that interfaces the computing device 1000 with one or more external devices. For example, the computing device 1000 may display text, images, etc. by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   receiving a document that has a people tag assigned thereto, wherein the people tag comprises first data that is indicative of an identity of a first individual that corresponds to the document, wherein the first data comprises a unique identifier assigned to the first individual by a service, and wherein the people tag is assigned to the document by an assignor;
   receiving identification authentication data from a second individual;
   transmitting the identification authentication data to the service;
   subsequent to transmitting the identification authentication data to the service, receiving contact data from the service pertaining to the second individual, wherein the contact data comprises data that is indicative of identities of contacts of the second individual, and wherein the contact data further comprises the unique identifier assigned to the first individual by the service;
   accessing the contact data
   comparing the contact data with the first data, the comparing comprising determining that both the contact data and the first data comprise the unique identifier; and
   displaying the document on a computer screen in conjunction with text that identifies the first individual to the second individual based at least in part upon determining that both the contact data and the first data comprise the unique identifier, wherein the text indicates a name of the first individual as assigned to the first individual by the second individual.

2. The method of claim 1 configured for execution on a personal computing device.

3. The method of claim 2, wherein the personal computing device is one of a desktop computer, a laptop computer, a mobile telephone, a gaming console, or a mobile media player.

4. The method of claim 1, wherein the document is an image.

5. The method of claim 4, wherein the people tag is assigned to a particular position in the image.

6. The method of claim 5, further comprising:
   receiving a selection of the document from the second individual; and
   displaying the image on the computer screen, wherein displaying the digital image comprises displaying the text that identifies the first individual at the particular position in the digital image.

7. The method of claim 1, wherein the first data comprises an email address of the first individual, and wherein the contact data comprises the email address of the first individual, and further comprising:
   when comparing the contact data with the first data, determining that both the contact data and the first data comprise the email address of the first individual; and
   causing the text to be displayed in conjunction with the graphical item that represents document based at least in part upon determining that both the contact data and the first data comprise the email address of the first individual.

8. The method of claim 1, wherein the first data comprises a name assigned to the first individual by the assignor, and wherein the contact data comprises the name assigned to the first individual by the second individual, and further comprising:
   when comparing the contact data with the first data, determining that both the contact data and the first data comprise the name of the first individual; and
   causing the text to be displayed in conjunction with the graphical item that represents the document based at least in part upon determining that both the contact data and the first data comprise the name of the first individual.

9. The method of claim 8, wherein the name assigned by the second individual for the first individual is different from a name assigned by the assignor for the first individual, wherein the name assigned by the assignor for first individual is included in the first data and the name assigned by the second individual for the first individual is included in the contact data.

10. A system that facilitates selectively organizing documents on a personal computing device, the system comprising:
    a processor; and
    a memory that comprises a plurality of components that are executed by the processor, the plurality of components comprising:
      a matcher component that undertakes a comparison between content of a people tag assigned to a document with contact data, wherein the people tag is assigned to the document by an assignor, wherein the people tag is representative of a first individual that corresponds to the document, wherein the people tag comprises data that is indicative of an identity of the first individual, wherein the data that is indicative of the identity of the first individual comprises a unique identifier assigned to the first individual by a service, wherein the contact data comprises data pertaining to contacts of a second individual signed into the service, the contact data received at the personal computing device from the service responsive to the second individual providing authentication data to the service, wherein the contact data comprises the unique identifier, and wherein the matcher component locates a particular contact represented in the contact data that corresponds to the first individual based at least in part upon the comparison; and
      an organizer component that automatically organizes the document amongst a plurality of other documents by causing the document to be associated with a graphical item that represents the particular contact of the second individual, wherein the graphical item has text corresponding thereto that is assigned by the second individual to identify the first individual, wherein the organizer component selectively displays the document together with the text that identifies the second individual based at least in part upon the people tag comprising the unique identifier and the contact data comprising the unique identifier.

11. The system of claim 10, wherein the document is one of an image or a video.

12. The system of claim 10, wherein the personal computing device comprises the matcher component and the organizer component.

13. The system of claim 10, wherein the people tag comprises an email address corresponding to the second individual and the contact data comprises the email address, wherein the organizer component selectively displays the document together with the text that identifies the second individual based at least in part upon the people tag comprising the email address and the contact data comprising the email address.

14. The system of claim 10, wherein the matcher component receives a plurality of documents that have a plurality of people tags assigned thereto, wherein the people tags comprise data that is indicative of identities of a plurality of individuals, wherein the matcher component compares content of the people tags with the contact data, and wherein the organizer component automatically organizes the plurality of documents with respect to contacts of the second individual based at least in part upon the comparison.

15. The system of claim 10, wherein the people tag is assigned to a particular position in the document.

16. The system of claim 10, wherein the plurality of components further comprises an identifier component that receives identity authentication data from the second individual and transfers the authentication data to the service responsive to receipt of the identity authentication data.

17. A computer-readable data storage device comprising instructions that, when executed by a processor, cause the processor to perform acts comprising:
receiving an image, wherein the image comprises a people tag assigned thereto by an assignor, wherein the people tag comprises first data that is indicative of an identity of a first individual that is included in the image, wherein the first data comprises a unique identifier assigned to the first individual by a service;
receiving contact data pertaining to a plurality of contacts of a second individual responsive to the second individual providing identification authentication data to the service, wherein the contact data comprises data that is indicative of identities of the contacts of the second individual, wherein the first individual is a contact of the second individual, and wherein the contact data comprises the unique identifier and second data generated by the second individual to identify the first individual to the second individual;
comparing the first data with the contact data, the comparing comprising determining that both the contact data and the first data comprise the unique identifier;
determining that the first individual is a contact of the second individual based at least in part upon the comparing of the first data with the contact data; and
causing the image to be displayed in conjunction with the second data when the second individual is logged into the service at a computing device being utilized to view the image based at least in part upon the first data comprising the unique identifier and the contact data comprising the unique identifier.

18. The computer-readable data storage device of claim 17, wherein the first data comprises an email address of the first individual, and wherein the contact data comprises the email address of the first individual, and the instructions further comprising:
when comparing the contact data with the first data, determining that both the contact data and the first data comprise the email address of the first individual; and
causing the image to be displayed in conjunction with the second data when the second individual is logged into the service at the computing device being utilized to view the image based at least in part upon the contact data comprising the email address of the first individual and the first data comprising the email address of the first individual.

19. The computer-readable data storage device of claim 17, wherein the first data comprises a name assigned to the first individual by the assignor, wherein the second data comprises a name assigned to the first individual by the second individual, and the instructions further comprising:
when comparing the contact data with the first data, determining that the name assigned to the first individual by the assignor and the name assigned to the first individual by the second individual are identical; and
causing the image to be displayed in conjunction with the second data when the second individual is logged into the service at the computing device being utilized to view the image based at least in part upon the determining that the name assigned to the first individual by the assignor and the name assigned to the first individual by the second individual are identical.

20. The computer-readable data storage device of claim 17 comprised by a mobile telephone.

\* \* \* \* \*